US008513834B2

(12) United States Patent
Takami (10) Patent No.: US 8,513,834 B2
(45) Date of Patent: Aug. 20, 2013

(54) POWER SUPPLY APPARATUS AND IMAGE FORMING APPARATUS

(75) Inventor: Hiroshi Takami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 12/703,175

(22) Filed: Feb. 9, 2010

(65) Prior Publication Data

US 2010/0209132 A1 Aug. 19, 2010

(30) Foreign Application Priority Data

Feb. 18, 2009 (JP) .................................. 2009-035813

(51) Int. Cl.
*H02J 3/36* (2006.01)
(52) U.S. Cl.
USPC .............................................. 307/82; 363/65
(58) Field of Classification Search
USPC ........................................ 307/82, 83; 363/65
See application file for complete search history.

(56) References Cited

U.S. PATENT DOCUMENTS

| 5,424,934 A | 6/1995 | Tanuma et al. ................. 363/65 |
| 5,566,060 A * | 10/1996 | Shimer et al. ................... 363/65 |
| 2004/0004403 A1* | 1/2004 | Schienbein et al. ............ 307/82 |
| 2008/0265676 A1* | 10/2008 | Cho et al. ........................ 307/31 |

FOREIGN PATENT DOCUMENTS

| JP | 10-341572 A | 12/1998 |
| JP | 2000-102249 | 4/2000 |
| JP | 2000-333458 | 11/2000 |
| JP | 2002-10642 A | 1/2002 |
| JP | 2003-324957 A | 11/2003 |
| JP | 2003-330251 | 11/2003 |

* cited by examiner

*Primary Examiner* — Rexford Barnie
*Assistant Examiner* — Haihui Zhang
(74) *Attorney, Agent, or Firm* — Fitzpatrick, Cella, Harper & Scinto (57) ABSTRACT

The power supply apparatus includes a plurality of voltage rising circuits each of which can be driven at a different duty ratio so as to convert and output a voltage output from a direct current power source according to a plurality of loads; and a control circuit which controls an input voltage from the direct current power source to each voltage rising circuit according to drive condition of the voltage rising circuit having the highest duty ratio of the plurality of voltage rising circuits. This configuration can provide a highly productive power supply apparatus capable of reducing a ripple voltage.

16 Claims, 9 Drawing Sheets

|  | OUTPUT TARGET VALUE | OUTPUT FROM TRANSFORMER POWER SUPPLY 352 | DRIVE DUTY |
|---|---|---|---|
| OUTPUT 1 | -520V | 10V | 90% |
| OUTPUT 2 | -500V | 10V | 86% |
| OUTPUT 3 | -500V | 10V | 83% |
| OUTPUT 4 | -500V | 10V | 80% |

FIG. 6B

|  | OUTPUT TARGET VALUE | OUTPUT FROM TRANSFORMER POWER SUPPLY 352 | DRIVE DUTY |
|---|---|---|---|
| OUTPUT 1 | -500V | 10.32V | 87% |
| OUTPUT 2 | -540V | 10.32V | 90% |
| OUTPUT 3 | -500V | 10.32V | 80% |
| OUTPUT 4 | -500V | 10.32V | 77% |

|  | OUTPUT TARGET VALUE | LOAD ADJUSTMENT CIRCUIT CURRENT | DRIVE DUTY |
|---|---|---|---|
| OUTPUT 1 | -500V | 25.0μA | 90% |
| OUTPUT 2 | -500V | 25.0μA | 86% |
| OUTPUT 3 | -500V | 25.0μA | 83% |
| OUTPUT 4 | -500V | 25.0μA | 80% |

FIG. 8B

|  | OUTPUT TARGET VALUE | LOAD ADJUSTMENT CIRCUIT CURRENT | DRIVE DUTY |
|---|---|---|---|
| OUTPUT 1 | -500V | 20.2μA | 87% |
| OUTPUT 2 | -540V | 20.2μA | 90% |
| OUTPUT 3 | -500V | 20.2μA | 80% |
| OUTPUT 4 | -500V | 20.2μA | 77% |

POWER SUPPLY APPARATUS AND IMAGE FORMING APPARATUS

BACKGROUND OF THE INVENTION

1. Field of the Invention

The present invention relates to a power supply apparatus and an image forming apparatus mounting the same.

2. Description of the Related Art

Japanese Patent Application Laid-Open No. 2000-102249 discloses a configuration of a high voltage power supply for use in an image forming apparatus using an electrophotographic system.

The above high voltage power supply can be mounted on the image forming apparatus to generate a high bias voltage for use in each step of the electrophotographic process. For example, four high voltage power supplies are mounted on a 4-color image forming apparatus, and the output voltage of each high voltage power supply can be used as a bias voltage of yellow, cyan, magenta and black in a charging step or a developing step respectively.

However, in order to provide a plurality of kinds of high bias voltage, the above conventional techniques need the same number of voltage rising circuits as the kinds of high bias voltage. That is, the number of high voltage power supplies to be mounted on the image forming apparatus increases proportionally with the number of kinds of high bias voltage, leading to an increase in costs of the image forming apparatus.

In order to suppress the increase in costs, there has been proposed a configuration of sharing a transformer used by each high voltage power supply with a plurality of high voltage power supplies. However, the configuration is required to consider the characteristic variations of a target voltage of each high voltage power supply, a voltage rising transformer and the like to determine the output level of the shared transformer power supply. Therefore, it is difficult to perform optimization according to the operating conditions of each high voltage power supply and thus a ripple voltage occurring in the output voltage may increase.

SUMMARY OF THE INVENTION

In view of the above circumstances, the present invention has been made, and an object of the present invention is to provide a highly productive power supply apparatus capable of using a plurality of high voltage power supplies each outputting a different high voltage and reducing a ripple voltage occurring in the output voltage.

Another object of the present invention is to provide a highly productive power supply apparatus capable of using a plurality of voltage converting circuits each outputting a different high voltage and reducing the ripple of the output voltage.

Still another object of the present invention is to provide a power supply apparatus including a plurality of voltage convert circuits each of which can convert and output a voltage output from a direct current power source using a transformer and can change a drive duty ratio of the transformer; and a control circuit which controls an input voltage from the direct current power source to the voltage convert circuit according to a drive condition of the voltage convert circuit having the highest drive duty ratio of the plurality of voltage convert circuits.

A further object of the present invention is to provide a power supply apparatus including a plurality of voltage convert circuits each of which can convert and output a voltage output from a direct current power source using a transformer and can change a drive duty ratio of the transformer; and a control circuit which controls a load of the voltage convert circuit according to a drive condition of the voltage convert circuit having the highest drive duty ratio of the plurality of voltage convert circuits.

A further object of the present invention is to provide a power supply apparatus including a direct current power source; a plurality of voltage convert circuits; a clock generation section which generates a plurality of clocks for driving each of the plurality of voltage convert circuits; and a power adjustment circuit which controls an output from the direct current power source according to a driving state of each of the plurality of voltage convert circuits, wherein each of the voltage convert circuits includes a transformer where an output from the direct current power source is supplied to a primary coil thereof; an output section which is connected to a secondary coil of the transformer and generates an output voltage; a comparator which compares between a target value of the output voltage and the output voltage value output from the output section; and a switching section which controls a drive duty of the transformer according to the clock and the comparison results of the comparator, and wherein the power adjustment circuit includes: a detection unit which detects the drive duty ratio of each of the transformers of the plurality of voltage convert circuits; and a direct current power source adjustment unit which compares the duty ratio of each of the plurality of voltage convert circuits with a predetermined value and based on the comparison results, adjusts the output of the direct current power source supplied to the primary coil of the transformer.

A further object of the present invention is to provide an image forming apparatus having a plurality of image forming portions, the image forming apparatus including: a plurality of voltage rising circuits each of which converts a voltage output from a direct current power source using a transformer to be output to the plurality of image forming portions and can change a drive duty ratio of the transformer; an input voltage control circuit which controls an input voltage from the direct current power source to the voltage convert circuit according to a drive condition of the voltage convert circuit having the highest drive duty ratio of the plurality of voltage convert circuits; and a control section which outputs a clock and a signal indicating an output target value to each of the plurality of voltage convert circuits in order to perform variable control on the drive duty ratio.

A further object of the present invention is to provide an image forming apparatus having a plurality of image forming portions, the image forming apparatus including: a plurality of voltage convert circuits each of which converts a voltage output from a direct current power source using a transformer to be output to the plurality of image forming portions and can change a drive duty ratio of the transformer; an input voltage control circuit which controls a load of the voltage convert circuit according to a drive condition of the voltage convert circuit having the highest drive duty ratio of the plurality of voltage convert circuits; and a control section which outputs a clock and a signal indicating an output target value to each of the plurality of voltage convert circuits in order to perform variable control on the drive duty ratio.

Other and further objects of the present invention will be apparent by referring to the detailed description and the accompanying drawings.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, exemplary embodiments of the present invention will be exemplarily described in detail by referring to the accompanying drawings. It should be noted that the components described in the embodiments are just for exemplification, and are not intended to limit the scope of the present invention only to these embodiments.

(Underlying Technology)

Figure 2:
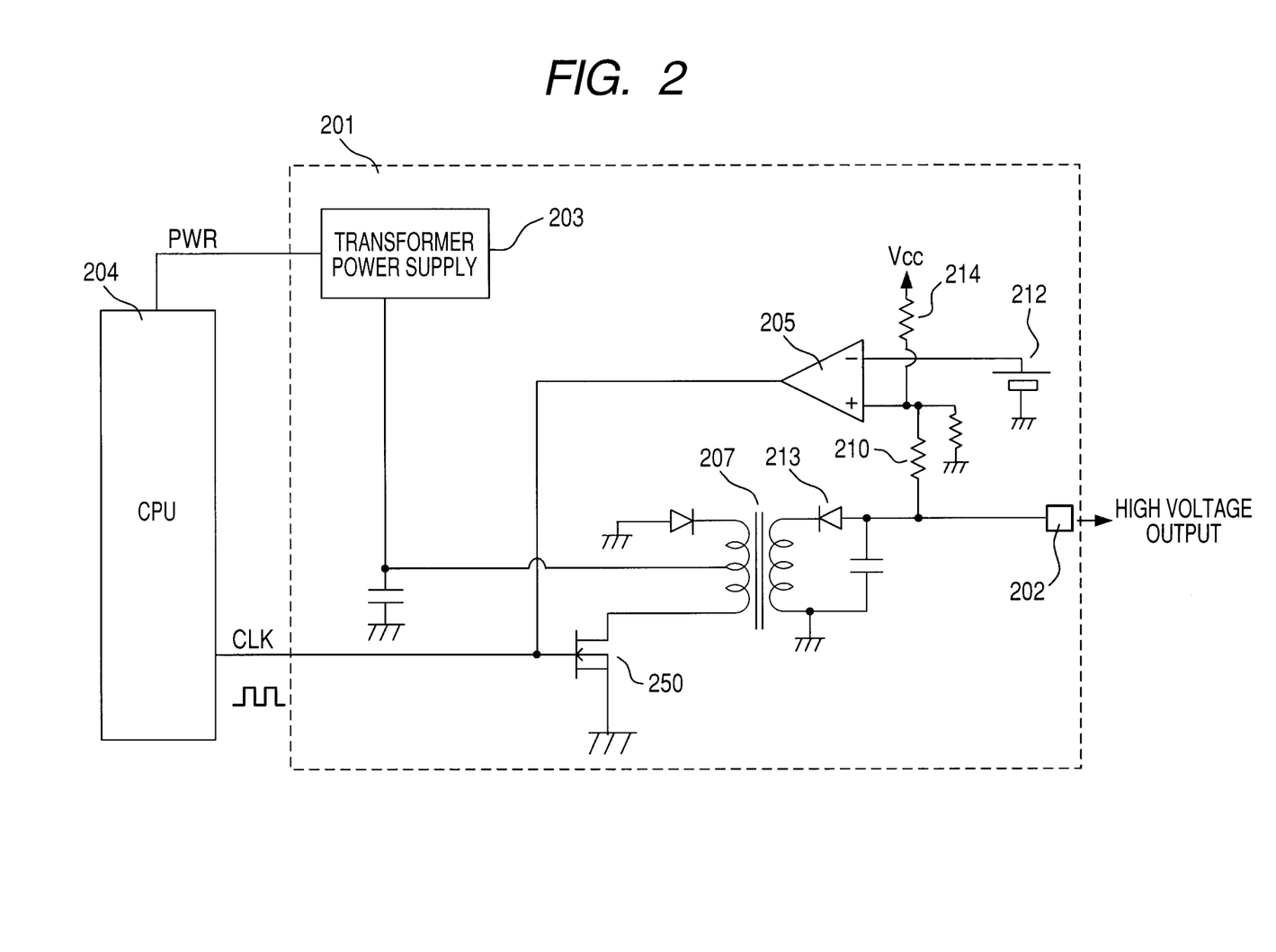
FIG. 2 is a circuit diagram of a high voltage power supply as an underlying technology.

Before describing the embodiments of the present invention, an underlying technology will be described using the accompanying drawings. FIG. 2 is a block diagram of a voltage rising circuit which outputs one kind of high voltage. In FIG. 2, a voltage rising circuit 201 outputs a desired high voltage output from an output terminal 202. A direct current voltage is applied from a transformer power supply 203 to a primary coil of a voltage rising transformer 207 which is driven by a switching operation of an FET 250. Note that the FET 250 is operated by a clock output from a central processing unit (CPU) 204. The CPU 204 functions as a clock generation unit. When the voltage rising transformer 207 is driven, a high voltage alternating voltage occurs at the secondary coil. The high voltage alternating voltage is smoothed by a diode 213 and a capacitor 209, and a negative direct current high voltage occurs at the output terminal 202. The output terminal 202 is divided by resistors 210, 212 and 214 and then is connected to a positive input of the comparator 205.

Meanwhile, the negative electrode of the comparator 205 is connected a reference voltage 212 which outputs a predetermined voltage level according to an output target value. The comparator 205 outputs the comparison result between the output voltage level and the target value. The output of the comparator 205 is input to a gate of the FET 250 and the CPU 204. If the output voltage is lower than the target value, the output of the comparator 205 goes high, and the clock input to the gate of the FET 250 continues to increase the level of the output terminal 202. If the output voltage is higher than the target value, the output of the comparator 205 goes low, and the clock input to the gate of the FET 250 stops to decrease the level of the output terminal 202. Thus, a control-loop in which the voltage rising transformer 207 is driven or stopped according to the output voltage is configured to control the level of the output terminal 202 to a predetermined value, enabling variable control on the output voltage of the transformer power supply 203 according to a PWR signal output from the CPU 204.

First, consider performing a different power control on each of a plurality of kinds of load using a plurality of voltage rising circuits 201 illustrated in FIG. 2. Unfortunately, an output voltage ripple becomes large simply by sharing a single transformer power supply with a plurality of voltage rising circuits. In order to solve this problem, embodiments are considered as follows.

First Embodiment

<Configuration>

Figure 1:
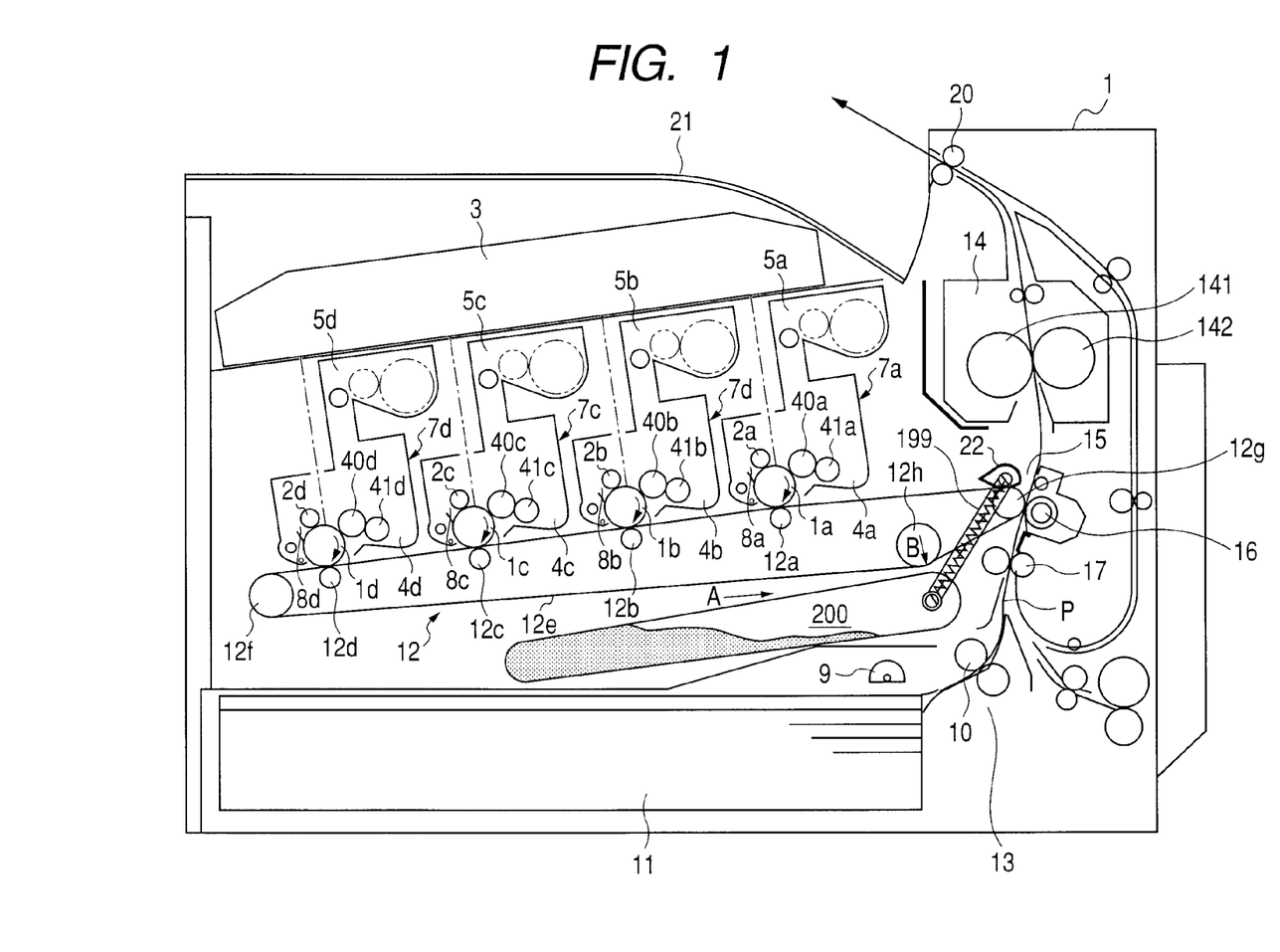
FIG. 1 illustrates a configuration of a printer as an embodiment of the present invention.

FIG. 1 illustrates a configuration of a color laser beam printer as a first embodiment of an image forming apparatus according to the present invention.

The printer includes process cartridges 7a to 7d each readily attachable to and detachable from a printer main body 1. These four process cartridges 7a to 7d each have the same structure, but contain a different color toner: yellow (Y), magenta (M), cyan (C), and black (Bk) respectively for use in forming an image. The process cartridges 7a to 7d include developing units 4a to 4d and toner units 5a to 5d respectively. Of them, the developing units 4a to 4d each include photosensitive drums 1a to 1d each serving as an image bearing member, charging rollers 2a, 2b, 2c and 2d, cleaning blades 8a to 8d, and a waste toner container. The developing units 4a to 4d include developing rollers 40a to 40d and developer applying rollers 41a to 41d respectively. Primary transfer rollers 12a to 12d are provided inside the intermediate transferring belt 12e each facing photosensitive drums 1a to 1d respectively and configured to apply a transfer bias by a bias applying unit (not illustrated).

A scanner unit 3 is provided above the process cartridges 7a to 7d and performs light exposure on the photosensitive drums 1a to 1d based on an image signal. The photosensitive drums 1a to 1d are each charged to a predetermined negative potential by the charging rollers 2a to 2d, and then an electrostatic latent image is formed by the scanner unit 3. The electrostatic latent image is reversally developed by the developing units 4a to 4d and negative toner is adhered thereto. Then, Y, M, C and Bk toner images are formed respectively. The intermediate transferring belt unit 12 is configured such that the intermediate transferring belt 12e is suspended in a tensioned state by a drive roller 12f, a secondary transfer facing roller 12g, and a tension roller 12h. The tension roller 12h applies a tension force in the direction indicated by arrow B.

The toner image formed on the photosensitive drums 1a to 1d is rotated as each photosensitive drum is rotated in the direction indicated by the arrow and the intermediate transferring belt 12 is rotated in the direction indicated by the arrow A. Further, a positive bias is applied to the primary transfer rollers 12a, 12b, 12c and 12d. Then, a primary transfer is performed sequentially starting with the toner image on the photosensitive drums 1a. The toner image is transferred to the intermediate transferring belt 12e, and then the toner image in a state of four colors overlapped thereon is conveyed to a secondary transfer section 15. A feed conveyance apparatus 13 includes a paper feed roller 9 which feeds a transfer material P from a paper feed cassette 11 which stores the transfer material P; and a conveying roller 10 which conveys the fed transfer material P. The transfer material P conveyed from the feed conveyance apparatus 13 is conveyed to a secondary transfer section 15 by a registration roller pair 17. The secondary transfer section 15 applies a positive bias to a secondary transfer roller 16 to perform secondary transfer on the conveyed transfer material P so as to transfer the 4-color toner image on the intermediate transferring belt 12e thereon. After the toner image is transferred, the transfer material P is conveyed to a fixing apparatus 14, where a fixing roller 141 and a pressure roller 142 applies heat and pressure so as to fix the toner image on the surface thereof. The fixed transfer material P is discharged to a paper discharge tray 21 by a discharging roller pair 20.

After the toner image is transferred, the toner remaining on the surface of each of the photosensitive drums 1a to 1d is removed by the respective cleaning blades 8a to 8d. After the secondary transfer is performed on the transfer material P, the toner remaining on intermediate transferring belt 12e is removed by a transfer belt cleaning apparatus 22. The removed toner passes through a waste toner conveying path 199 and is recovered in a waste toner recovery container 200.

<Power Supply Apparatus>

Figure 3:
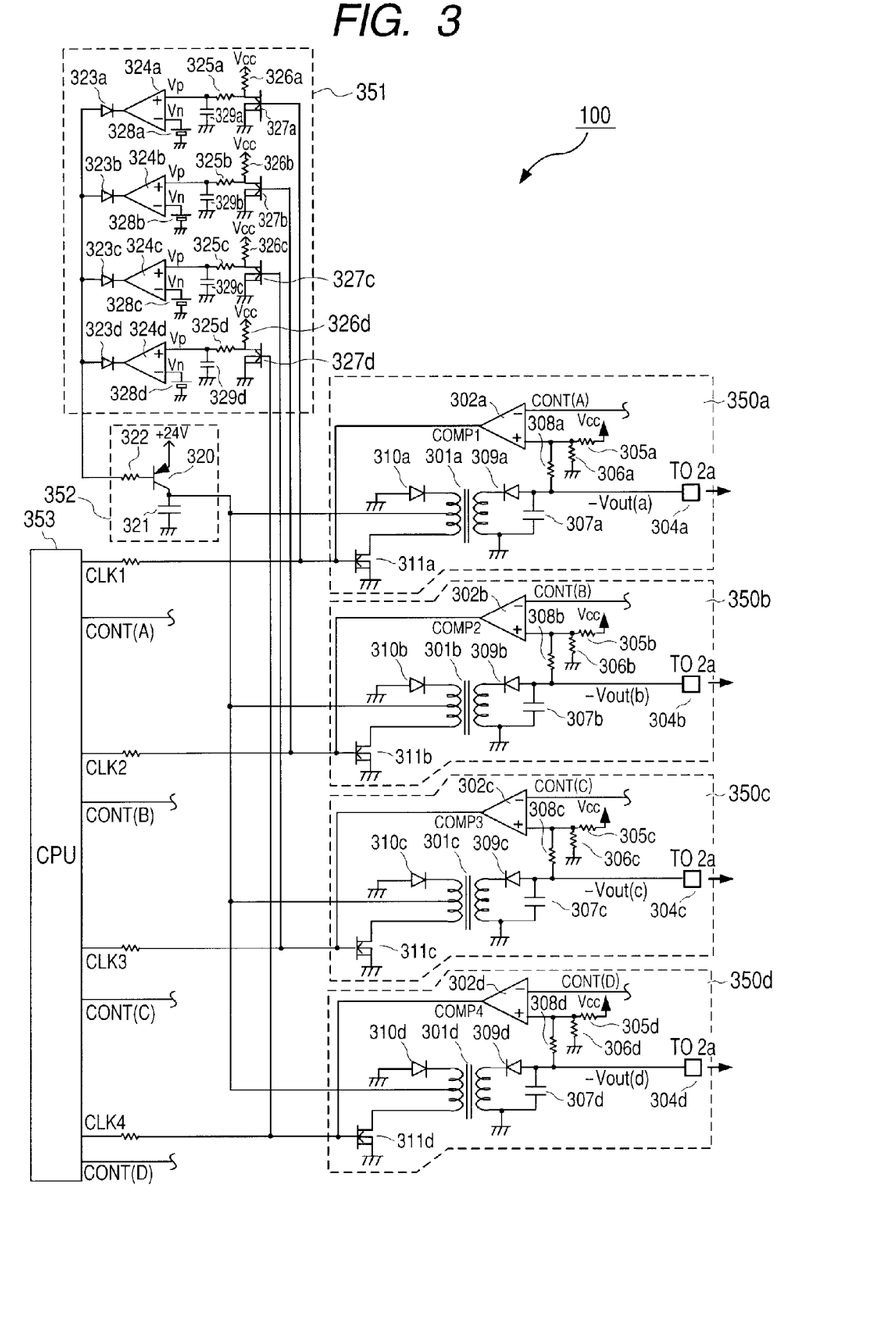
FIG. 3 illustrates a circuit configuration of the high voltage power supply as an embodiment of the present invention.

Hereinafter, a configuration of the power supply apparatus 100 which generates a charge bias to be applied to charging rollers 2a to 2d will be described. FIG. 3 is an internal circuit diagram of the power supply apparatus 100. The power supply apparatus 100 includes voltage rising circuits 350a to 350d, a duty ratio determination circuit 351, and a transformer power supply 352. The charge bias is output from each of the output terminals 304a to 350d each provided in the respective voltage rising circuits 350a to 350d. Each of the voltage rising circuits is a converting circuit that converts an input voltage. Although this embodiment is explained by the structures with the voltage rising circuit, the circuit that lowers an input voltage to switch a present voltage to a low voltage can be also applied to the embodiment. Each of the output terminals 304a to 304d is connected to the respective charging rollers 2a to 2d and is configured such that a different level of high bias voltage can be applied to each roller. The power supply apparatus 100 is controlled by clocks CLK 1 to 4 and target voltage signals CONT (A to D) each serving as a control signal from the CPU 353 so as to output a charge bias at a desired timing and level. That is, the CPU 353 functions as a clock generation unit for generating a clock. The power supply apparatus 100 performs an output level control using a first control-loop provided in the voltage rising circuits 350a to d and a second control-loop including the duty ratio determination circuit 351 and the transformer power supply 352 serving as a direct current power source.

<Voltage Rising Circuit>

An internal configuration of voltage rising circuits 350a to 350d each of which generates a charge bias will be described in detail. Each of the voltage rising circuits 350a to 350d can be driven at a different duty ratio so as to convert and output a voltage output from a single direct current power source according to a plurality of loads. Each of the four voltage rising circuits 350a to d has the same structure. Thus, here, only the voltage rising circuit 350a is taken as an example and described. The voltage rising circuit 350a includes a voltage rising transformer 301a, an FET 311a, a diode 309a, a capacitor 307a, an output terminal 304a, resistors 308a, 306a and 305a, and a comparator 302a. A voltage supplied from the transformer power supply 352 is applied to a primary coil of the voltage rising transformer 301a. When the CPU 353 outputs the CLK 1, the FET 311a performs a switching operation. Then, the voltage rising transformer 301a is driven, and a high voltage alternating voltage occurs at the secondary coil thereof. The generated high voltage alternating voltage is smoothed by the diode 309a and the capacitor 307a, and a negative direct current voltage −Vout (a) occurs at the output terminal 304a. The output terminal 304a is divided by the resistors 308a, 306a and 305a and then is connected to a positive input of the comparator 302a.

Figure 4:
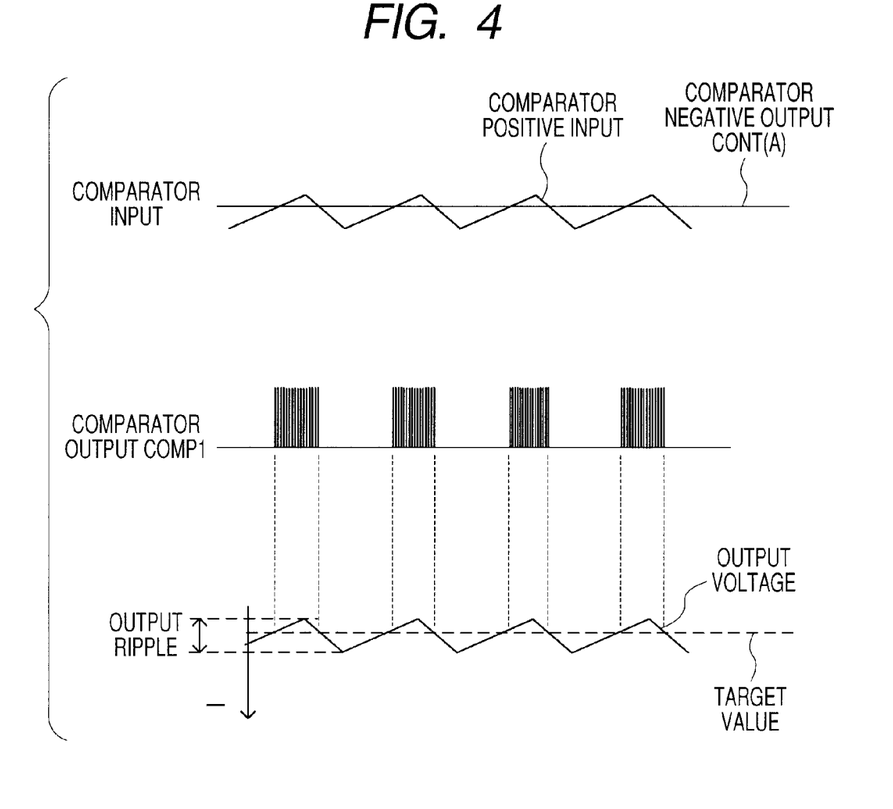
FIG. 4 illustrates an output voltage from the high voltage power supply as an embodiment of the present invention.

The comparator 302a functions as a comparison unit for comparing between a voltage value of an output voltage and a target value. A CONT (A) signal output from the CPU 353 is input to a negative input of the comparator 302a. The CONT (A) signal is an analog signal to be set between 0 V to Vcc according to a target voltage level of the output terminal 304a. The comparator 302a outputs the comparison result between the output voltage level and the target value. A waveform of an input signal of the comparator 302a, an output value COMP 1 from the comparator 302a, and a waveform of the output voltage value −Vout (a) are as illustrated in FIG. 4. If the positive input voltage of the comparator 302a is higher than the negative input voltage, namely, the output voltage level is smaller than the target value, the output of the comparator goes high.

Now, by referring back to FIG. 3, the CLK 1 sent from the CPU 353 is input to a gate of the FET 311a, which drives the voltage rising transformer 301a to start increasing the output voltage. As the output voltage increases, the positive input of the comparator 302a decreases. When the positive input voltage is lower than the negative input voltage, the COMP 1 output from the comparator is switched to a low state. Then, the CLK 1 sent from the CPU 353 is blocked by the COMP 1 output from the comparator 302a to turn the FET 311a off. Then, the voltage rising transformer 301a stops and the output voltage is lowered. That is, the output is adjusted by the duty ratio of the drive clock of the voltage rising transformer 301a. The above configured control-loop can be used to control the output voltage to a desired level. The control-loop configured inside each of the voltage rising circuits 350a to 350d is referred to as a first control-loop.

<Ripple>

Here, a ripple appearing at an output voltage of the voltage rising circuit 350a will be described. As illustrated in FIG. 4, a serrated ripple appears at the output voltage.

Figure 5A:
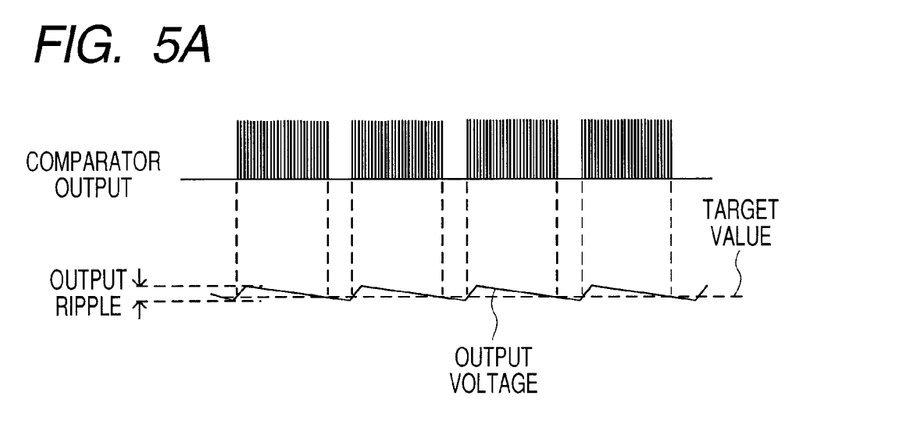
FIG. 5A is a high bias voltage waveform diagram of a first embodiment and illustrates an output voltage when a voltage rising transformer has a large duty ratio.
Figure 5B:
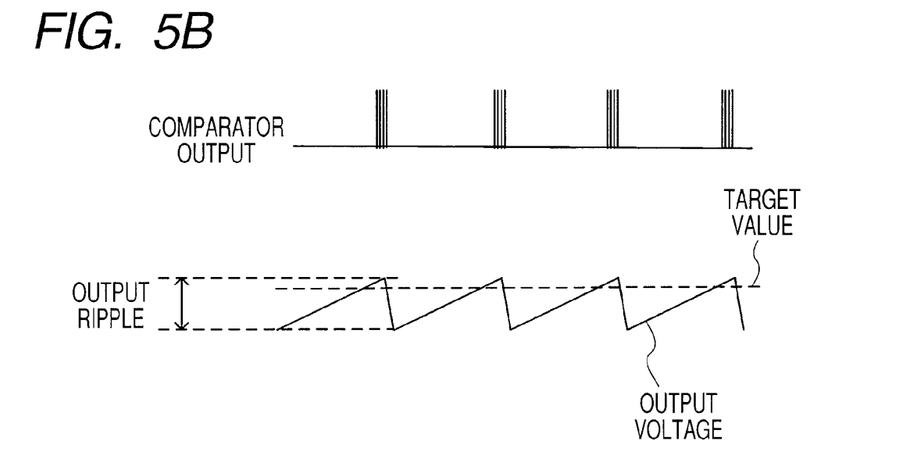
FIG. 5B is a high bias voltage waveform diagram of the first embodiment and illustrates an output voltage when a voltage rising transformer has a small duty ratio.

The ripple level is determined by the size of the ratio (hereinafter referred to as a duty ratio) between the driving period and the stop period of the voltage rising transformer 301a according to the voltage control. The higher the duty ratio, the smaller the ripple. Each of the waveforms illustrated in FIGS. 5A and 5B illustrates the output voltages having a large duty ratio and a small duty ratio of the voltage rising transformer 301a respectively.

The large duty ratio of the voltage rising transformer 301a indicates a small inclination of increase (downward in the figure) in the output voltage when the voltage rising transformer 301a is driven. The inclination of increase (downward in the figure) in the output voltage becomes small when the voltage applied to the primary coil of the voltage rising transformer is small; the voltage rising ratio of the voltage rising transformer is small; or the load current is large. When the inclination of increase (downward in the figure) in the output voltage is small, the waveform becomes close to the one illustrated in FIG. 5A and the output voltage ripple becomes small.

On the other hand, the small duty ratio indicates a large inclination of increase (downward in the figure) in the output voltage when the voltage rising transformer 301a is driven. When the inclination of increase (downward in the figure) in the output voltage is large, the waveform becomes close to the one illustrated in FIG. 5B and the output voltage ripple becomes large. According to the present embodiment, in order to decrease the ripple, the voltage applied to the primary coil of the voltage rising transformer is increased. Therefore, the input voltage is changed as needed. That is, in order to increase the duty ratio of the four transformers "as much as possible", a transformer driving at the highest duty ratio of the four transformers is controlled at a duty ratio of 90%. Then, the transformer power supply 352 is adjusted so that the transformer is driven at a predetermined duty ratio (90%). Since the input voltage is controlled at a duty ratio of 90%, even if the transformer load is suddenly changed, the voltage control is correctly performed by the duty control. If the input voltage is controlled at a duty ratio of 100%, the duty control cannot work for a change in load.

<Duty Ratio Determination Circuit>

In FIG. 3, the duty ratio determination circuit 351 detects each duty ratio of the voltage rising transformers 301a to d and selects the voltage rising transformers controlled at a predetermined duty ratio or more to generate a control signal of the transformer power supply as described later. The clock signal COMP 1 for driving the FET 311a of the voltage rising transformer 301a is connected to a gate terminal of the FET 327a in the duty ratio determination circuit 351. The source terminal of the FET 327a is connected to a positive input terminal of the operational amplifier 324a through a filter circuit including a power supply Vcc, resistors 325a and 326a, and a capacitor 329a. Thus, a direct current voltage Vp corresponding to the duty ratio of the COMP 1 is applied to a positive input of the operational amplifier 324a. The voltage Vp can be expressed in the following expression.

$$Vp = Vcc \times (1 - DUTY\ 1 \times DUTY\ 2) \quad \text{(Expression 1)}$$

Here, Vcc denotes a power supply voltage; DUTY 1 denotes a duty ratio of the voltage rising transformer 301a; and DUTY 2 denotes a duty ratio of the clock CLK 1 output from the CPU 353 which is high.

Meanwhile, a reference voltage Vn is applied to a negative input of the operational amplifier 324a. The Vn level is set to be the same as that occurring at the positive input of the operational amplifier 324a when the duty ratio of the voltage rising transformer 301a is 90%. That is, the voltage Vn can be expressed in the following expression.

$$Vn = Vcc \times (1 - 0.9 \times DUTY\ 2) \quad \text{(Expression 2)}$$

The operational amplifier 324a operates according to the duty ratio of the voltage rising transformer 301a as follows.

(1) When the duty ratio of the voltage rising transformer 301a is less than 90%, a power supply voltage of 24 V is output to the output terminal of the operational amplifier 324a. At this time, the diode 323a is turned off.

(2) When the duty ratio of the voltage rising transformer 301a is equal to or greater than 90%, Vp<Vn. The voltage of the output terminal of the operational amplifier 324a decreases and the diode 323a is turned on. The anode voltage of the diode 323a is output as a control signal of the transformer power supply 352.

The clock signals COMP 2, COMP 3 and COMP 4 for driving the respective voltage rising transformer 301b to d are input to the duty ratio determination circuit 351 in the same manner as the clock signal COMP 1. Then, the voltage levels each corresponding to the respective duty ratios of the voltage rising transformer 301b to 301d are output from the operational amplifier 324b, 324c and 324d respectively.

According to the above configured circuit, of the voltage rising transformers 301a to 301d, only the output of the operational amplifier corresponding to the voltage rising transformer having a duty ratio of 90% or more drives the transformer power supply 352.

As a result, the duty ratio determination circuit 351 detects a duty ratio of 90% or more. In a transitional state of control, a plurality of voltage rising transformers may have a duty ratio of more than 90%, but the output of the duty ratio determination circuit 351 is fed back to the transformer power supply circuit and the duty ratio of each of the four clocks gradually decreases. Finally, a signal having the highest duty ratio is selected, and thereby a second loop is formed.

Thus, the filter circuit including the FET 327a, the power supply Vcc, the resistors 325a and 326a, and the capacitor 329a functions as a detection unit for detecting respective duty ratios of the plurality of voltage rising circuits 350a to 350d. The operational amplifier 324a functions as a control region comparison unit for comparing between each duty ratio of the plurality of voltage rising circuits 350a to 350d and a predetermined value (here, 90%).

Figure 9:
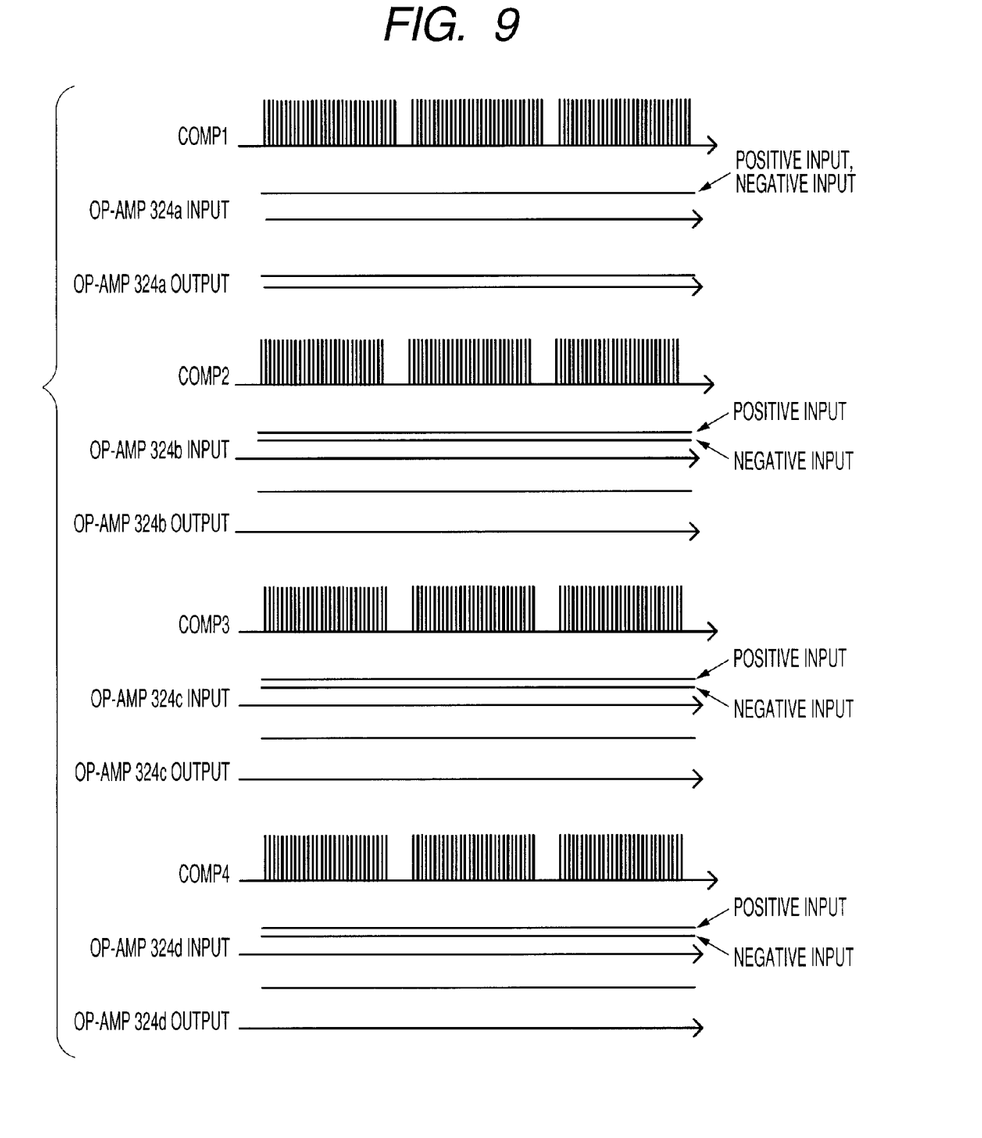
FIG. 9 is a waveform diagram of a duty ratio determination circuit of the first embodiment.

FIG. 9 is a waveform inside the duty ratio determination circuit 351. The COM 1 is a waveform of the voltage rising transformer 301 having a duty ratio of 90%. The direct current voltage expressed by the expression 1 is applied to the positive input of the operational amplifier 324a. A voltage having a duty ratio of substantially 90% is input to the negative input as expressed by the expression 2. That is, the positive input of the operational amplifier 324a has the same voltage as the negative input thereof. The output of the operational amplifier 324a is controlled by a direct current voltage and input to the transformer power supply 352 through the diode 323a.

On the other hand, in the operational amplifier 324b corresponding to the voltage rising transformer 301b driven at a duty ratio of less than 90%, the positive input voltage Vp is higher than the negative input voltage Vn. Thus, a reverse bias is applied to the diode 323b to be turned off. The same operation is performed on the voltage rising transformer 301c and the voltage rising transformer 301d. Thus, if the respective duty ratio is less than 90%, the diodes 323c and 323d are turned off.

<Transformer Power Supply>

Based on the output result from the duty ratio determination circuit 351, the transformer power supply 352 adjusts the power supply voltage to be applied to each primary coil of the voltage rising transformers 301a to 301d. That is, the transformer power supply functions as a direct current power source adjustment unit which adjusts the output of the direct current power source each supplied to the primary coil of the voltage rising transformer according to the comparison results of the control region comparison unit. Of the voltage rising transformers 301a to 301d, if only the duty ratio of the voltage rising transformer 301a exceeds 90%, the output of the operational amplifier 324a decreases. Then, the output passes through the diode 323a and the resistor 322, causing a base current of the transistor 320 to flow. Thus, the transistor 320 applies the voltage to each primary coil of the voltage rising transformers 301a to 301d.

The transistor 320 performs an analog operation. Thus, here, the voltage applied to each primary coil of the voltage rising transformers 301a to 301d is proportional to the base current flowed through the diode 323a and the resistor 322. Therefore, the voltage is lower than 24 V. More specifically, when the duty ratio of the voltage rising transformer 301a exceeds 90%, a voltage of 24 V or less required and sufficient to be applied to the voltage rising transformer 301*a* is output from the transformer power supply 352 and applied to the primary coil of the voltage rising transformer 301*a*.

As described above, the duty ratio determination circuit 351 functions as the power adjustment circuit which controls the output from the direct current power source according to each duty ratio of a plurality of voltage rising circuits.

<Second Voltage Control-Loop>

The power supply apparatus 100 reduces ripples occurring at an output voltage using a control-loop including the duty ratio determination circuit 351 and the transformer power supply 352. According to the present embodiment, the control-loop is called a second control-loop. The combination of the duty ratio determination circuit 351 and the transformer power supply 352 functions as a control circuit which controls an input voltage to each voltage rising circuit according to the drive condition of the voltage rising circuit having the highest duty ratio of the plurality of voltage rising circuits 350*a* to 350*d*. Based on the output of the duty ratio determination circuit 351, the transformer power supply 352 controls the input voltage to the voltage rising transformers 301*a* to 301*d*.

Figure 6A:
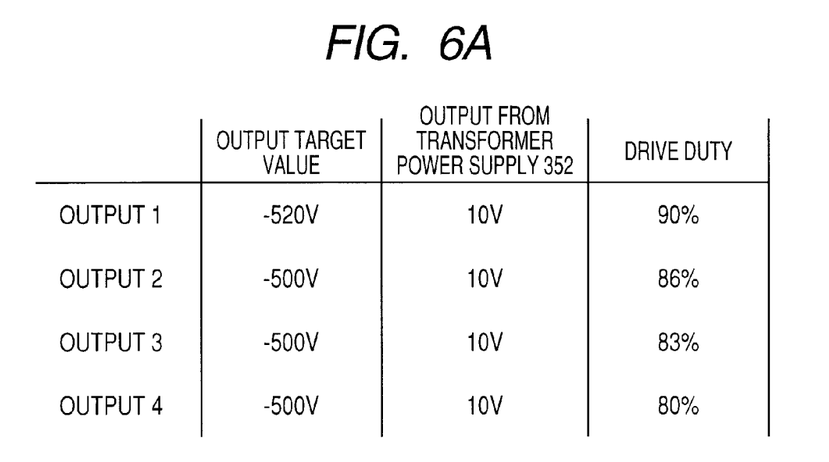
FIG. 6A is an operation setting table of a first embodiment.
Figure 6B:
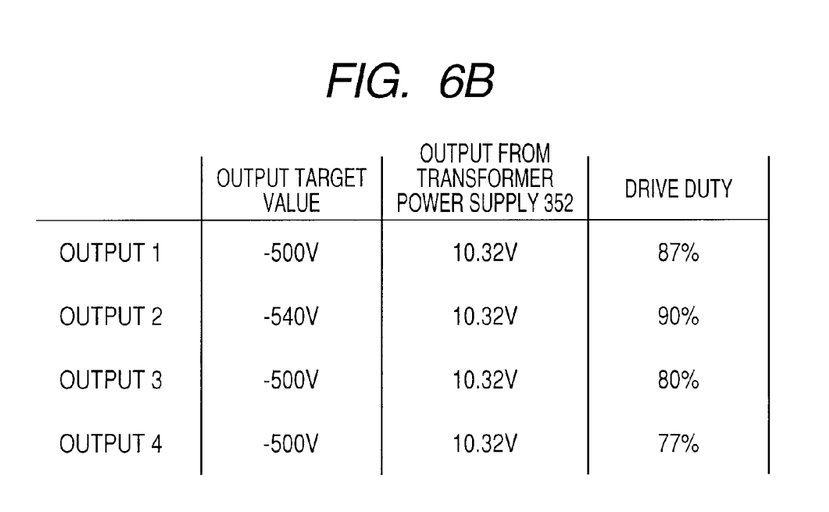
FIG. 6B is an operation setting table of the first embodiment.

As described above, the second voltage control-loop controls such that the duty ratios of the four transformers are made to increase as much as possible; the transformer having the highest duty ratio is controlled at 90%; and the other three transformers are adjusted at less than 90%. That is, in a state where all voltage rising transformers have high duty ratios, a voltage control is performed using the second control-loop to reduce ripples of each high voltage output. FIGS. 6A and 6B each illustrate a relationship between four output values of charge bias output by the power supply apparatus and the duty ratios. FIG. 6A illustrates the duty ratios when all the four high bias voltage output values are controls at −500 V. The second control-loop controls so as to set the duty ratio of the output 1 to 90%.

That is, the voltage rising transformer 301*a* generating the output 1 has the lowest voltage rising ratio and the highest duty ratio in comparison with the other voltage rising transformers. Thus, the transformer power supply 352 performs the output adjustment so that the duty ratio of the output 1 is controlled at 90%. Further, the first control-loop controls such that the output value is controlled at a target value of −520 V. The first control-loop also controls such that the duty ratios of the outputs 2, 3 and 4 are adjusted at less than 90% and the output values are controlled at a target value of −500 V.

FIG. 6B illustrates the duty ratios when the output target value of the output 2 is controlled at −540 V, and the other outputs are controls at −500 V. In this case, the second control-loop controls so as to set the duty ratio of the output 2 to 90%. The output 2 has the highest output target value and the highest duty ratio in comparison with the other outputs. Thus, the transformer power supply 352 performs the output adjustment so that the duty ratio of the output 2 is controlled at 90%. The first control-loop also controls such that the duty ratios of the outputs 1, 3 and 4 are adjusted at less than 90% and the output values are controlled at a target value of −500 V.

As described above, the power supply apparatus according to the present embodiment includes the first control-loop for controlling the drive ratios of a plurality of voltage rising transformers; and the second control-loop for adjusting the input voltages to the voltage rising transformers so that the highest value of the duty ratios of the plurality of voltage rising transformers matches a predetermined level. The first control-loop can control the output voltage at a target value and the second control-loop can reduce ripples occurring at a high bias voltage.

Moreover, the power supply apparatus can be used as a high voltage power supply supplying power to an image forming apparatus using an electrophotographic process to reduce ripples occurring at a high bias voltage and prevent image quality from deteriorating.

Second Embodiment

Figure 7:
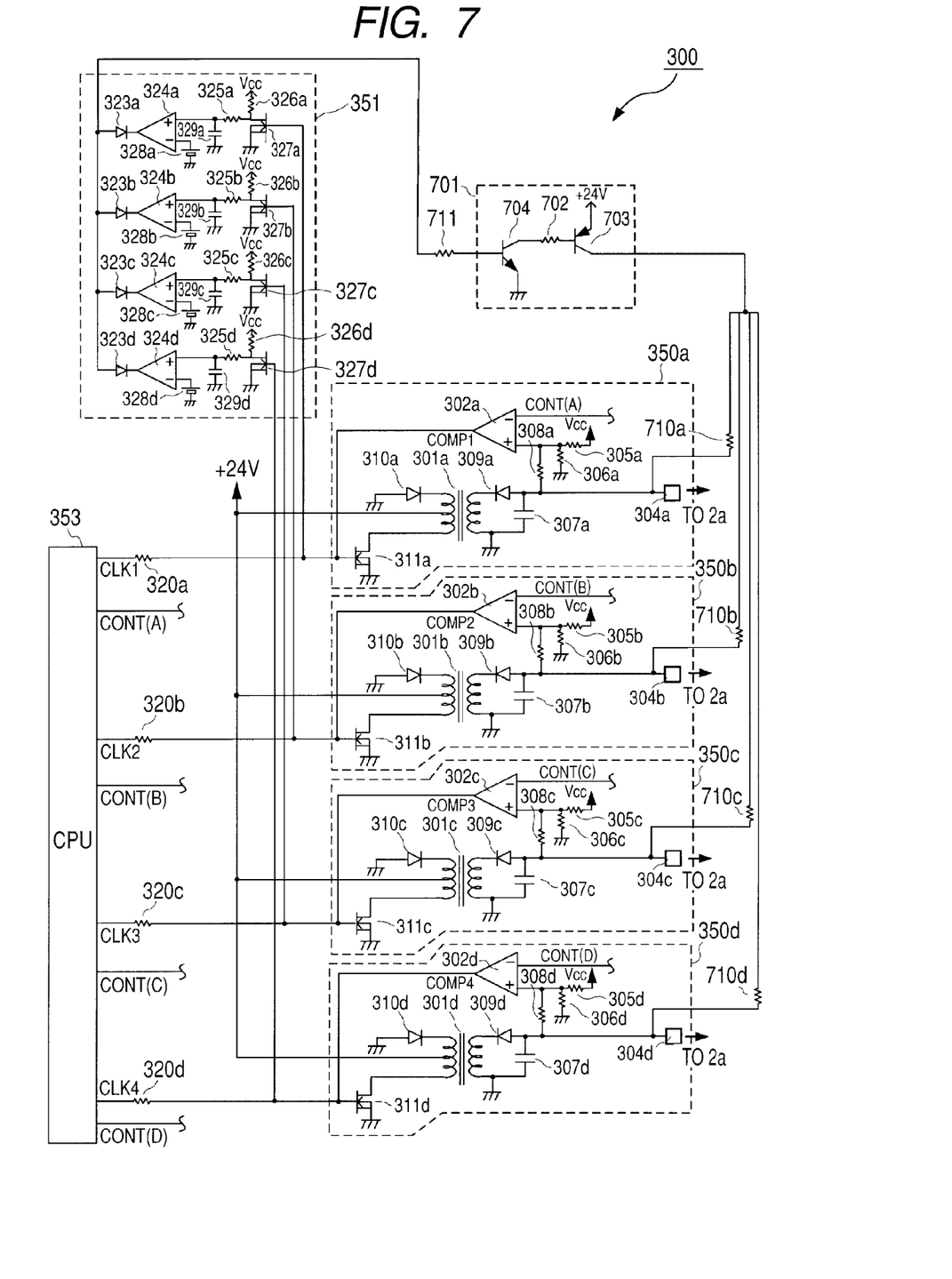
FIG. 7 illustrates a configuration of a high voltage power supply of a second embodiment.

Hereinafter, the second embodiment of the present invention will be described by referring to FIGS. 7, 8A and 8B. FIG. 7 illustrates a configuration of the power supply apparatus 300 as the second embodiment. The configuration of the first control-loop is the same as that of the first embodiment, but the configuration of the second control-loop differs from that of the first embodiment. Thus, here, only the portions differing from those of the first embodiment will be described.

A load adjustment circuit 701 is added.

The output of the duty ratio determination circuit 351 is connected to the load adjustment circuit 701.

The power source applying voltage to the primary coils of the voltage rising transformers is fixed to 24 V.

<Load Adjustment Circuit>

Based on the detection results of the duty ratio determination circuit 351, the load adjustment circuit 701 adjusts the secondary load current of each of the voltage rising transformers 301*a* to 301*d*. Each of resistors 710*a* to 710*d* is connected to the respective voltage rising transformers 301*a* to 301*d* and is connected to the 24 V power source through a transistor 703. The transistor 703 is connected to a collector terminal of a transistor 704 through a resistor 702. The above configuration allows variable control to be performed on the load current of each of the voltage rising transformers 301*a* to 301*d* by adjusting the base current of the transistor 704 and changing the collector current of the transistor 703. The base of the transistor 704 is connected to the duty ratio determination circuit 351 through a resistor 711.

<Second Voltage Control-Loop>

The power supply apparatus 300 uses the second control-loop including the duty ratio determination circuit 351 and the load adjustment circuit 701 to control so as to reduce the levels of ripples occurring at an output voltage. More specifically, the load of each voltage rising transformer is controlled so that the voltage rising transformer controlled at the highest duty ratio has a duty ratio of 90%. The duty ratio determination circuit 351 and the load adjustment circuit 701 function as a control circuit which controls the load of each voltage rising circuit according to the drive condition of the voltage rising circuit having the highest duty ratio of the plurality of voltage rising circuits.

That is, in a state where all voltage rising transformers have high duty ratios, a voltage control is performed using the first control-loop to reduce ripples of each high voltage output. FIGS. 8A and 8B each illustrate a relationship between four output values of charge bias output by the power supply apparatus 300 and the duty ratios.

Figure 8A:
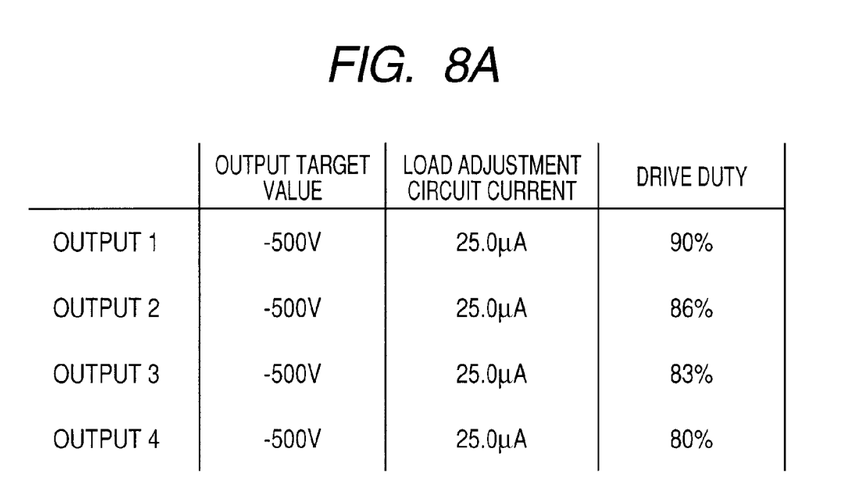
FIG. 8A is an operation setting table of the second embodiment.

FIG. 8A illustrates the duty ratios when all the four high bias voltage output values are controls at −500 V. The second control-loop controls so as to set the duty ratio of the output 1 to 90%. That is, the voltage rising transformer 301*a* generating the output 1 has the lowest voltage rising ratio and the highest duty ratio in comparison with the other voltage rising transformers. Thus, the load adjustment circuit 701 performs the load current adjustment so that the duty ratio of the output 1 is controlled at 90%. Further, the first control-loop controls such that the output value is controlled at a target value of −500 V. The first control-loop also controls such that the duty ratios of the outputs 2, 3 and 4 are adjusted at less than 90% and the output values are controlled at a target value of −500 V.

Figure 8B:
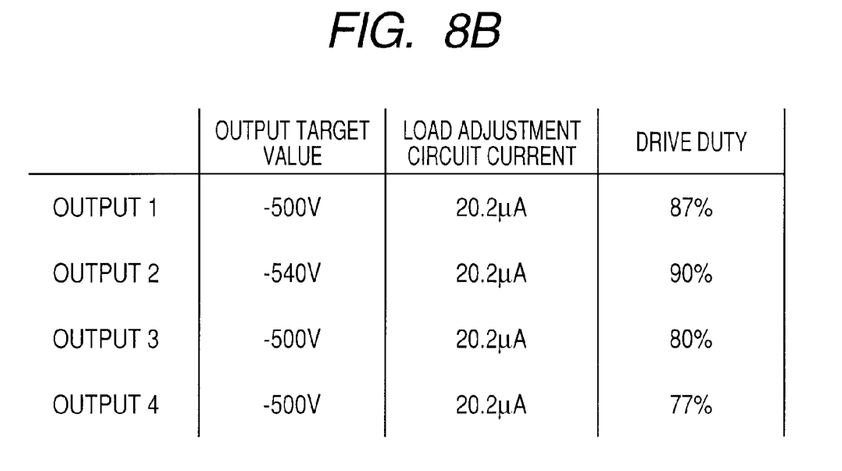
FIG. 8B is an operation setting table of the second embodiment.

FIG. 8B illustrates the duty ratios when the output value of the output 2 is controlled at −540 V, and the other outputs are controlled at −500 V. In this case, the second control-loop controls so as to set the duty ratio of the output 2 to 90%. The output 2 has the highest output target value and the highest duty ratio in comparison with the other outputs. Thus, the load adjustment circuit 701 performs the load current adjustment so that the duty ratio of the output 1 is controlled at 90%. Further, the first control-loop controls such that the output value is controlled at a target value of −540 V. The first control-loop also controls such that the duty ratios of the outputs 1, 3 and 4 are adjusted at less than 90% and the output values are controlled at a target value of −500 V.

As described above, the power supply apparatus according to the present embodiment includes the first control-loop for controlling the drive ratios of a plurality of voltage rising transformers so that the output voltage matches the target value; and the second control-loop for adjusting the load current to the voltage rising transformers so that the highest value of the duty ratios of the plurality of voltage rising transformers matches a predetermined level. Thereby, control can be performed in a state where a plurality of voltage rising transformers has a high duty ratio; a plurality of high bias voltage can be controlled at a desired output voltage; and ripples occurring at a high bias voltage can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-035813, filed on Feb. 18, 2009, which is hereby incorporated by reference herein in its entirety.

What is claimed is:

1. A power supply apparatus comprising:
a direct current power source; a plurality of voltage converting circuits; a clock generation section which generates a plurality of clocks for driving each of said plurality of voltage converting circuits; and a power adjustment circuit which controls an output from the direct current power source according to a driving state of each of said plurality of voltage converting circuits,
wherein each of said voltage converting circuits includes:
a transformer where an output from the direct current power source is supplied to a primary coil thereof;
an output section which is connected to a secondary coil of the transformer and generates an output voltage;
a comparator which compares between a target value of the output voltage and the output voltage value output from the output section; and
a switching section which controls a drive duty of the transformer according to the clock and the comparison results of the comparator, and
wherein the power adjustment circuit includes:
a detection unit which detects the drive duty ratio of each of the transformers of the plurality of voltage converting circuits; and
a direct current power source adjustment unit which compares the duty ratio of each of said plurality of voltage converting circuits with a predetermined value and based on the comparison results, adjusts the output of said direct current power source supplied to the primary coil of the transformer.

2. An image forming apparatus having a plurality of image forming portions, the image forming apparatus comprising:
a plurality of voltage converting circuits each of which converts a voltage output from a direct current power source using a transformer to be output to the plurality of image forming portions and is capable of changing a drive duty ratio of the transformer;
an input voltage control circuit which controls an input voltage from the direct current power source to the voltage converting circuit according to a drive condition of the voltage converting circuit having the highest drive duty ratio of the plurality of voltage converting circuits; and
a control section which outputs a clock and a signal indicating an output target value to each of the plurality of voltage converting circuits in order to perform variable control on the drive duty ratio.

3. An image forming apparatus according to claim 2, further comprising an image bearing member on which an image is formed,
wherein the image forming portion includes a charging section for charging the image bearing member.

4. An image forming apparatus having a plurality of image forming portions, the image forming apparatus comprising:
a plurality of voltage converting circuits, each of which converts a voltage output from a direct current power source using a transformer to be output to the plurality of image forming portions and is capable of changing a drive duty ratio of the transformer;
an input voltage control circuit which controls a load of the voltage converting circuit according to a drive condition of the voltage converting circuit having the highest drive duty ratio of said plurality of voltage converting circuits; and
a control section which outputs a clock and a signal indicating an output target value to each of said plurality of voltage converting circuits in order to perform variable control on the drive duty ratio.

5. The image forming apparatus according to claim 4, further comprising an image bearing member on which an image is formed,
wherein the image forming portion includes a charging section for charging the image bearing member.

6. The image forming apparatus according to claim 4, wherein the load of the voltage converting circuit is an electric current which flows through the voltage converting circuits.

7. A power supply apparatus comprising:
a plurality of voltage converting units each of which converts a voltage output from a direct current power source, each voltage converting unit including a transformer for outputting a converted voltage and a drive portion of the transformer;
a duty detection unit which detects a drive duty ratio for each transformer of the plurality of voltage converting units; and
an input voltage control unit which controls an input voltage from the direct current power source to the voltage converting circuits according to a drive condition of the voltage converting circuits,
wherein the duty detection unit outputs a signal to the input voltage control unit according to the drive duty ratio of the voltage drive unit having a higher drive duty ratio than some of the voltage drive units.

8. The power supply apparatus according to claim 7, wherein the duty detection unit outputs a signal to the input voltage control unit according to the drive duty ratio of the voltage drive unit having a highest drive duty ratio.

9. A power supply apparatus comprising:
a plurality of voltage converting units each of which converts a voltage output from a direct current power source, each voltage converting unit including a transformer for outputting a converted voltage and a drive portion of the transformer;
a duty detection unit which detects a drive duty ratio for each transformer of the plurality of voltage converting units; and
an electric current control unit which controls an electric current which flows through the plurality of voltage converting units according to a drive condition of the voltage converting circuits,
wherein the duty detection unit outputs a signal to the electric current control unit according to the drive duty ratio of the voltage drive unit having a higher drive duty ratio than some of the voltage drive units.

10. The power supply apparatus according to claim 9, wherein the duty detection unit outputs a signal to the electric current control unit according to the drive duty ratio of the voltage drive unit having a highest drive duty ratio.

11. An image forming apparatus having a plurality of image forming portions, the image forming apparatus comprising:
a plurality of voltage converting units each of which converts a voltage output from a direct current power source, each voltage converting unit including a transformer for outputting a converted voltage to one of the image forming portions and a drive portion of the transformer;
a duty detection unit which detects a drive duty ratio for each transformer of the plurality of voltage converting units; and
an input voltage control unit which controls an input voltage from the direct current power source to the voltage converting circuits according to a drive condition of the voltage converting circuits,
wherein the duty detection unit outputs a signal to the input voltage control unit according to the drive duty ratio of the voltage drive unit having a higher drive duty ratio than some of the voltage drive units.

12. The image forming apparatus according to claim 11, wherein the duty detection unit outputs a signal to the input voltage control unit according to the drive duty ratio of the voltage drive unit having a highest drive duty ratio.

13. The image forming apparatus according to claim 11, further comprising an image bearing member on which an image is formed, wherein each image forming portion includes a charging section for charging the image bearing member.

14. An image forming apparatus having a plurality of image forming portions, the image forming apparatus comprising:
a plurality of voltage converting units each of which converts a voltage output from a direct current power source, each voltage converting unit including a transformer for outputting a converted voltage to one of the image forming portions and a drive portion of the transformer;
a duty detection unit which detects a drive duty ratio for each transformer of the plurality of voltage converting units; and
an electric current control unit which controls an electric current which flows through the plurality of voltage converting units according to a drive condition of the voltage converting circuits,
wherein the duty detection unit outputs a signal to the electric current control unit according to the drive duty ratio of the voltage drive unit having a higher drive duty ratio than some of the voltage drive units.

15. The power supply apparatus according to claim 14, wherein the duty detection unit outputs a signal to the electric current control unit according to the drive duty ratio of the voltage drive unit having a highest drive duty ratio.

16. The image forming apparatus according to claim 14, further comprising an image bearing member on which an image is formed, wherein each image forming portion includes a charging section for charging the image bearing member.

* * * * *